United States Patent [19]

Bopp

[11] Patent Number: 4,777,843
[45] Date of Patent: Oct. 18, 1988

[54] TWO MASS FLYWHEEL ASSEMBLY WITH VISCOUS DAMPING ASSEMBLY

[75] Inventor: Warren G. Bopp, Farmington Hills, Mich.

[73] Assignee: Eaton Corporation, Cleveland, Ohio

[21] Appl. No.: 58,726

[22] Filed: Jun. 5, 1987

[51] Int. Cl.$^4$ ............................................ F16F 15/10
[52] U.S. Cl. .................................. 74/574; 192/106.2; 192/3.21
[58] Field of Search ............ 74/574; 192/106.1, 106.2; 464/59, 64, 66, 68

[56] References Cited

U.S. PATENT DOCUMENTS

| | | | |
|---|---|---|---|
| 2,838,955 | 6/1958 | Burch | 74/574 |
| 3,262,527 | 7/1966 | Allaben, Jr. | 192/58 |
| 3,266,271 | 8/1966 | Stromberg | 64/27 |
| 4,274,524 | 6/1981 | Nakane | 74/574 X |
| 4,468,207 | 8/1984 | Yoshida | 74/574 X |
| 4,557,357 | 12/1985 | Tinholt | 192/3.21 |
| 4,576,259 | 4/1986 | Bopp | 192/3.21 |
| 4,584,901 | 4/1986 | Conseur | 74/574 |
| 4,615,237 | 10/1986 | Forkel | 74/574 |
| 4,663,983 | 5/1987 | Kobayashi et al. | 74/574 X |

FOREIGN PATENT DOCUMENTS

| | | | |
|---|---|---|---|
| 3610127 | 12/1986 | Fed. Rep. of Germany | 192/106.2 |
| 2153970 | 8/1985 | United Kingdom | 192/106.2 |
| 2175067 | 11/1986 | United Kingdom | 192/106.2 |

OTHER PUBLICATIONS

Drawing coded 170286 "Dual Mass Flywheel with Serial Damper" 2/1986.
Foreign paper by A. Sebulke et al, "Das Zwei-Massen-Schwungard, Ein Neuentwickelter Torsiondampfer fur Der PKW-Antriesstrang", (The Two-Mass-Flywheel, A Newly Developed Torsion Damper for Car Drivelines), coded 365150, (no date).

*Primary Examiner*—Dirk Wright
*Attorney, Agent, or Firm*—P. S. Rulon

[57] ABSTRACT

A torsional vibration isolation mechanism (30, 102 or 200) disposed in a two mass flywheel assembly (100) for reducing the effects of torsionals or vibration in a vehicle driveline and particularly high amplitude torque spikes occurring during resonance mode operation. The assembly includes primary and secondary flywheel assemblies (26,28), a resilient means 30 including a plurality of circumferentially spaced apart coil springs for attenuating torsional vibrations, and a viscous liquid damper 102 or 200 which increases damping in proportion to relative rotational velocity of the flywheel assemblies.

10 Claims, 3 Drawing Sheets

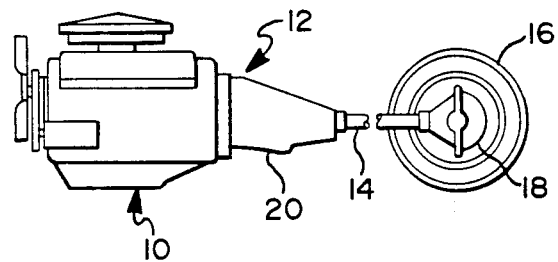
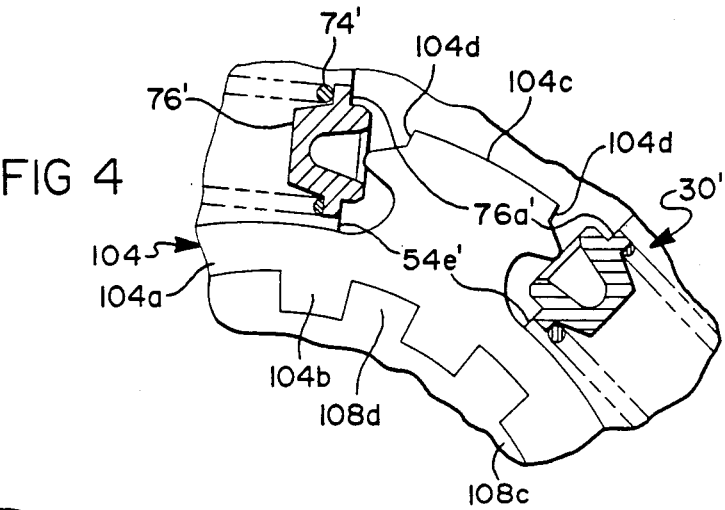
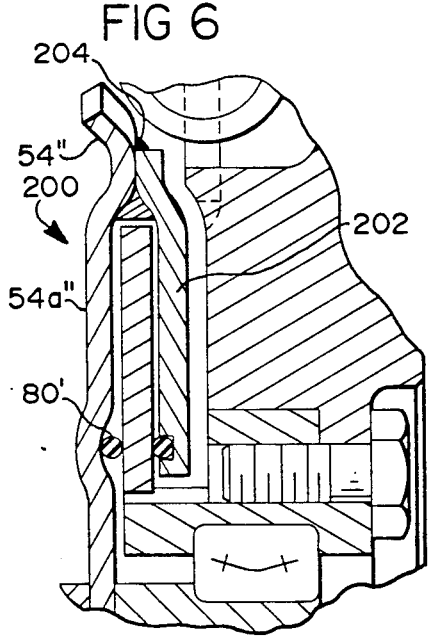
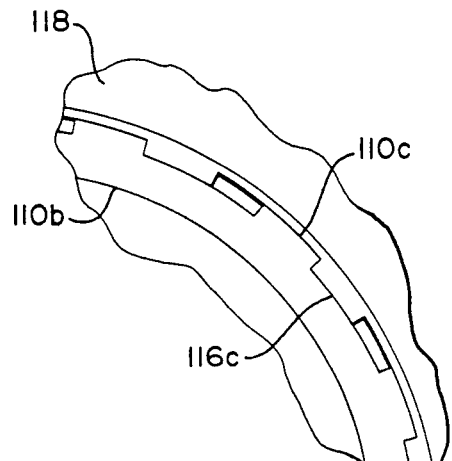

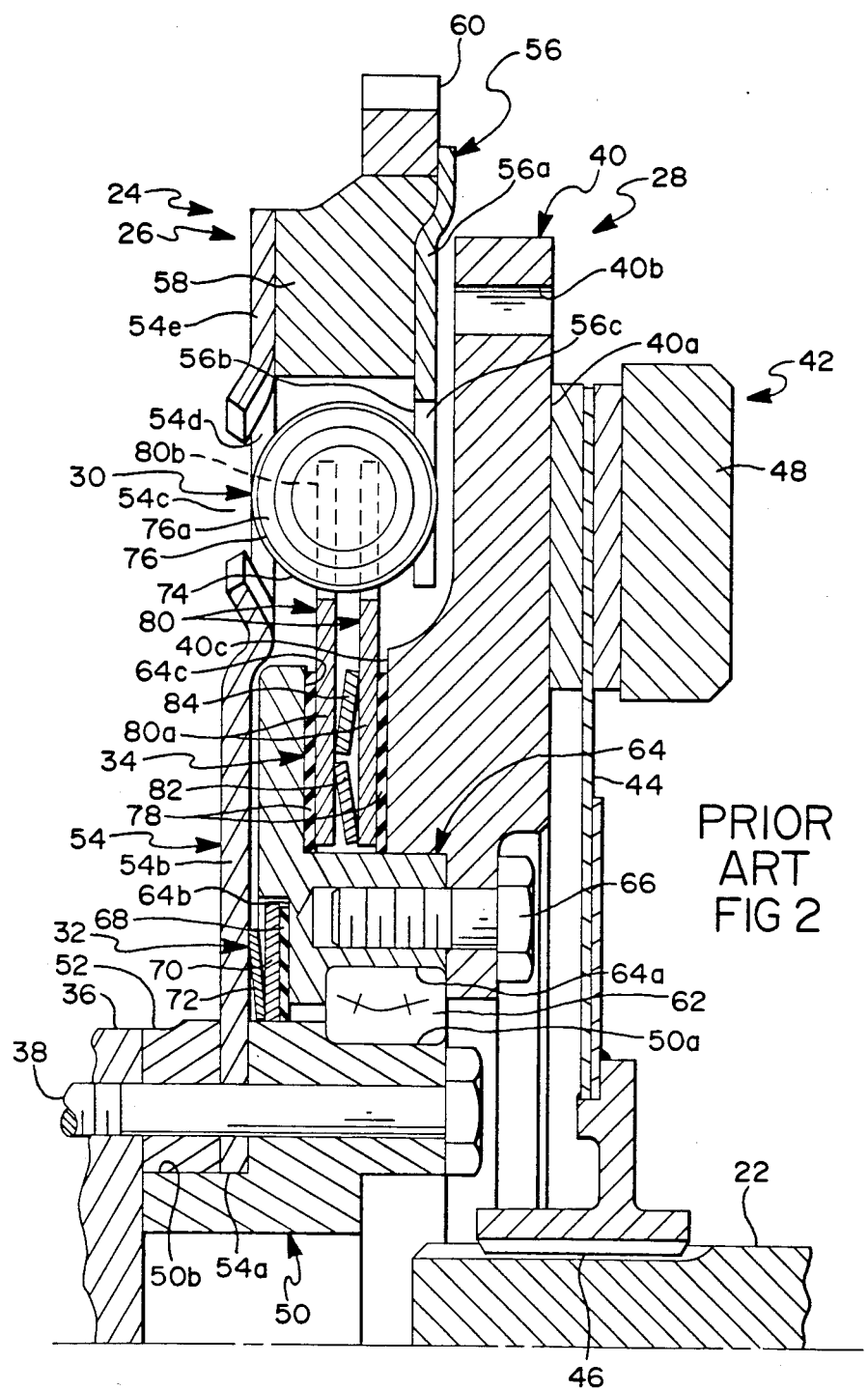

TWO MASS FLYWHEEL ASSEMBLY WITH VISCOUS DAMPING ASSEMBLY

FIELD OF THE INVENTION

This invention relates to a torsional vibration isolation mechanism. More specifically the invention relates to a two mass flywheel assembly having a mechanism for damping torsional vibration in a vehicle driveline driven by a cyclic combustion engine such as a piston engine.

BACKGROUND OF THE INVENTION

Torsional vibration isolation mechanisms have long been used to reduce the adverse effects of fluctuating torques or torsional vibrations in vehicle drivelines. A need to improve vehicle efficiency has necessitated developments that have dramatically increased transmission gear rattle noise. For example, engine efficiency has been improved by reducing the number of engine cylinders; unfortunately, this has increased torque fluctuations which cause gear rattle. Further, transmissions have been made more susceptible to gear rattle by adding speed ratios, by reducing parasitic friction, and by generally increasing transmission resonance to frequencies which occur at engine speeds in the vehicle's normal driving range.

The prior art, two mass flywheel assembly shown in FIG. 2 has been particularly effective in reducing gear rattle in driveline systems employing a master clutch which selectively connects an engine flywheel to a transmission input shaft. The assembly includes primary and secondary flywheel masses and a torsional isolation mechanism disposed between the masses. The isolation mechanism is relocated from the clutch plate of the master clutch, thereby simplifying the clutch plate and reducing its inertia which forms a continuous part of the transmission input shaft inertia. The reduced inertia facilitates quicker and easier synchronization of transmission ratio gears when the master clutch is disengaged. The primary flywheel mass is fixed to the engine shaft and the secondary flywheel mass is connected to the transmission input shaft only when the master clutch is engaged. When the secondary mass is connected to the input shaft, its added inertia lowers transmission resonance to frequencies less than engine speeds in the vehicle's normal driving range. Proper tuning of the two mass flywheel assembly lowers the driveline resonance to frequencies less than engine idle speeds.

While the above two mass flywheel assembly has effectively eliminated the problem of gear rattle, it has also introduced another problem, namely, resonance mode operation for brief periods during engine start-up/shut-down and in some cases when the engine is lugged at speeds less than normal operating speeds. Torque spikes occurring during these periods are known to be significant enough to damage the flywheel assembly and other components in the driveline system. Such damage is prevented in the prior art flywheel assembly of FIG. 2 by inserting a torque limiting clutch in series between the secondary mass and the torsional attenuating springs of the isolation mechanism. This torque limiting clutch adds cost and complexity to the flywheel assembly. Further, should the torque transmitting capacity of the clutch be set to high or increase for various reasons, the intended safeguard purpose of the clutch is lost. Still further, should the torque transmitting capacity be set to low or decrease during use to values less than are normally encountered, the clutch will continuously slip and soon fail, thereby rendering the vehicle inoperative.

SUMMARY OF THE INVENTION

An object of this invention is to provide a two mass flywheel assembly operative to effectively dampen all modes of resonance.

According to a feature of this invention, a torsional vibration isolation mechanism includes vibration attenuation springs and a damper assembly drivingly disposed in parallel between primary and secondary flywheel assemblies mounted for limited relative rotation about a common axis. The first flywheel assembly includes a hub adapted for non-complaint connection to an engine output shaft and having an outer peripheral surface, an annular inertia ring fixed between radially outer portions of first and second radially extending plates, the first plate having a radially inner portion fixed to the hub. The second flywheel assembly includes an annular radially extending inertia mass, an inner peripheral surface journaled on the outer peripheral surface of the hub, and a radially extending axially facing clutch surface adapted for selective connection to a transmission input shaft via a clutch operative to frictionally engage the clutch surface. The springs include a plurality of circumferentially spaced apart coil springs disposed between the plates and radially inward of the inertia ring; the spring ends react between portions of the plates. The springs resiliently interconnect the flywheel assemblies via a drive assembly including a ring portion disposed radially inward of the coil springs, means connecting the ring to the second secondary flywheel assembly, and a plurality of fingers extending radially outward into the spaces between the coil.

The improvement comprises an annular space including an axially extending portion generally defined by axially spaced apart portions of the first plate and the secondary flywheel assembly and a radially extending portion generally defined by radially spaced apart portions of the secondary flywheel assembly. The improvement further comprises the damper being a viscous shear damper disposed in the annular spaces and including an annular housing assembly and a clutch assembly respectively rotatable with the primary and secondary flywheel assemblies. The housing assembly includes first and second sidewalls respectively defining first and second radially extending clutch surfaces in axially facing and spaced apart relation defining a chamber sealed at its radially outer extent. The clutch assembly includes a radially extending clutch disposed in the chamber and having first and second radially extending and oppositely facing clutch surfaces respectively spaced from the first and second axially facing sidewall surfaces for clutch coaction therebetween via a viscous shear liquid disposed in the chamber and in response to relative rotation of the flywheel assemblies. Dynamic seals cooperate between the housing and clutch assemblies for sealing the radially inner portion of the chamber.

BRIEF DESCRIPTION OF THE DRAWINGS

The two mass flywheel assembly with torsional isolation mechanism of the present invention is shown in the accompanying drawings in which:

FIG. 1 is a schematic view of a motor vehicle driveline;

FIG. 2 is a half sectional view of a prior art two mass flywheel assembly;

FIGS. 4 and 5 are sectional views of a broken away portions of the flywheel assembly looking in the direction of arrows 4 and 5 in FIG. 3; and FIG. 6 is a broken away sectional view of an alternative embodiment of a portion of the flywheel assembly.

DETAILED DESCRIPTION OF THE DRAWINGS

Figure 3:
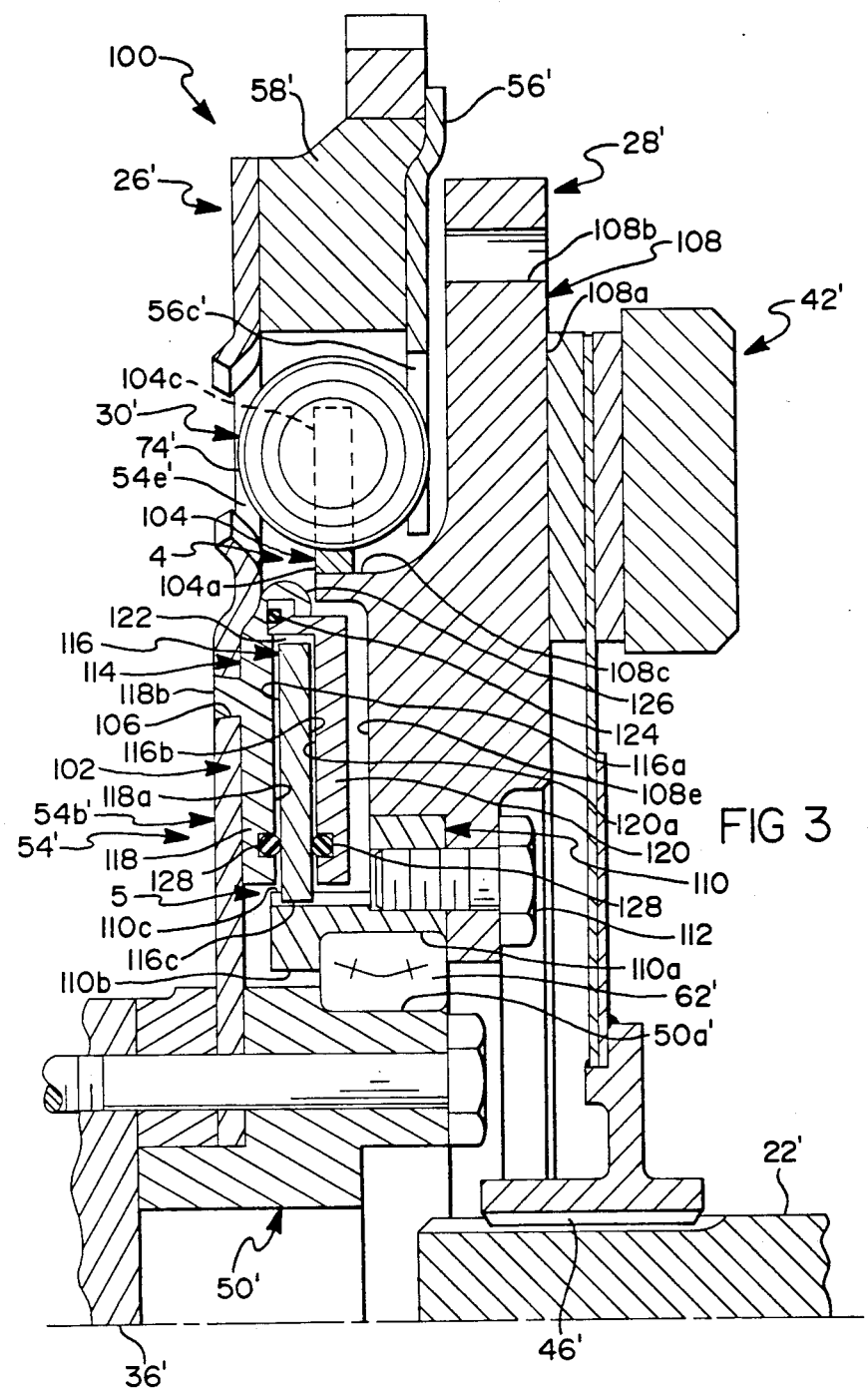
FIG. 3 is a half sectional view of the flywheel assembly according to the present invention.

The motor vehicle driveline seen schematically in FIG. 1 includes a prime mover or engine 10 and a transmission 12 having an output shaft 14 drivingly connected to a load such as a ground engaging wheel 16 via a differential gear assembly 18 for a rear and/or front axle of a vehicle. Prime mover 10 is preferably of the internal, periodic combustion type but may be any type of power plant having torque characteristics that are improved by a torsional vibration isolation mechanism. Transmission 12 includes a housing 20 containing a plurality of unshown, constant mesh ratio gears or ratio change mechanisms driven by a transmission input shaft 22 partially shown in FIG. 2. Well-known ratio change clutches or devices within the transmission are employed to selectively, i.e., manually or automatically, connect input shaft 22 with load driving shaft 14.

Looking now at the prior art two mass flywheel assembly 24 of FIG. 2, the assembly comprises primary and secondary or first and second flywheel assemblies 26, 28 rotatable about a common axis A, a torsional vibration isolation mechanism including resilient means 30 for attenuating torsional vibrations and a torsional vibration damper clutch assembly 32, and a torque limiting clutch assembly 34. Resilient means 30 and damper clutch assembly 32 are connected in parallel between the flywheel assemblies. Torque limiting clutch assembly 34 is connected in series between the resilient means and the secondary flywheel assembly. The primary flywheel assembly is fixed directly to a partially shown portion 36 of the engine output shaft by a plurality of bolts 38. Secondary flywheel assembly 28 includes a first annular friction surface 40a frictionally connectable to input shaft 22 of the transmission in response to selective engagement of a partially shown master clutch assembly 42. The clutch assembly includes a clutch plate 44 fixed for rotation with shaft 22 via a spline connection 46, and an annular pressure plate 48 fixed for rotation to secondary mass 40 via an unshown and conventional mechanism including means operative to squeeze friction linings of the clutch plate against surface 40a of the secondary mass 40. Since the driveline torsional vibration damper mechanism 30, 32 is located between the primary and secondary flywheel assembly, clutch plate 44 may be of simple, light weight construction which adds very little inertia to input shaft 22, thereby facilitating rapid synchronization of ratio gears in the transmission.

Primary flywheel assembly 26 includes a hub member 50, an annular spacer 52, first and second radially extending plate members 54, 56, and an inertia ring 58 having a starter ring gear 60 fixed thereto. Hub member 50 includes a radially outwardly facing peripheral surface 50a for journaling the secondary flywheel assembly thereon via a bearing assembly 62 which is preferably, but not necessarily, of the double row ball bearing type. First plate member 54 includes a central opening 54a receiving an axially extending stepped down portion 50b of hub 50, an intermediate radially extending sidewall portion 54b, a plurality of circumferentially spaced apart openings or windows 54c each having radially extending end surfaces 50d, and an outer radially extending sidewall portion 50e. Second plate member 56 includes an outer radially extending wall portion 56a and a plurality of circumferentially spaced apart opening 56b, each having radially extending ends 56c. Openings 54c, 56b and their ends 54e, 56c are axially aligned. Inertia ring 58 is securely fixed between outer sidewall portions 54f, 56a of plate members 54, 56 by conventional and unshown means, e.g., bolts or welding.

Secondary flywheel assembly 28 includes the annular radially extending mass 40 and an annular support member 64 securely fixed to mass 40 by a plurality of bolts 66. Mass 40 includes the master clutch friction surface 40a, a plurality of bolt holes 40b for securing the unshown portion of clutch assembly 42 to the secondary flywheel assembly, and a second annular radially extending friction surface 40c of torque limiting clutch 34. Annular support member 64 includes a radially inwardly facing peripheral surface 64a for journaling the secondary flywheel assembly on hub 50 via bearing 62, an annular recess defining an annular radially extending friction surface 64b of damper assembly 32, and a radially outwardly extending wall portion defining an annular radially extending friction surface 64c of torque limiting clutch 34.

Damper clutch assembly 32 includes a friction material 68 supported on an annular disk 70 and biased into contact with friction surface 64b by a spring washer 72 reacting against intermediate wall portion 54b of primary flywheel plate member 54. Disk 70 and spring washer 72 are secured for rotation with the primary flywheel assembly. Accordingly, clutch assembly 32 frictionally interconnects the flywheel assemblies at all times with a torque equal to the clutch assembly's torque capacity. As with all such mechanical friction devices, the torque capacity is determined by the coefficient of friction of material 68 and the force of spring washer 72.

Resilient means 30 is the same in all of the dual mass flywheel assembly embodiments disclosed herein. Details of the resilient means may be seen in FIG. 4; this figure is a broken away sectional view of the dual mass flywheel assembly in FIG. 3 and has all components common to the embodiments of FIGS. 2 and 3 designated by the same numeral but suffixed with a prime. Accordingly, as seen in FIG. 4, resilient means 30' includes a plurality of circumferentially spaced apart coil springs 74' and spring retainers or end caps 76' disposed at each spring end. A shoulder 76a' of each end cap reacts against surfaces 54d, 56c' of each window 54c', 56b' of plates 54', 56'.

With reference mainly to FIG. 2, torque limiting clutch 34 includes friction materials 78 supported on annular disk portions 80a of drive rings 80 and spring washers 82, 84 biasing the friction materials into contact with friction surfaces 40c, 64c of the secondary flywheel assembly. Drive rings 80 also include a plurality of finger portions 80b (phantom lines) extending radially outward between the spaced apart ends of coil springs 74. The finger portions are the same in cross section as finger portions 104c shown in FIG. 4. The finger portions have surfaces facing circumferentially in opposite directions and initially spaced from end surfaces of spring retainers 76. The initial spaces or gaps between the surfaces of the finger portions 80b and the spring retainers provide a relatively spring free torque stage at engine idle, i.e., the torque path between the flywheel assemblies is intended to be primarily via damper clutch assembly 32.

Operation of the dual mass flywheel assembly in FIG. 2 is rather straight forward. Springs 74 are designed to flexibly or resiliently transfer design torque between the flywheel assemblies via torque limiting clutch assembly 34. The springs attenuate normal torque fluctuations but do not limit peak torque or high amplitude torque spikes such as may occur during periods of sudden speed change or during periods of resonance mode operation. During such periods the springs go solid and provide a non resilient torque path between the flywheel assemblies. Ideally, the springs provide enough compliance to lower driveline resonance to frequencies less than engine speeds occurring in the vehicle's normal driving range. However, resonance mode operation excited by low engine speeds is known to occur for brief periods during engine start-up/shut-down and when the engine is lugged by speeds less than normal operating speeds. Driveline system damage due to resonance mode torque spikes occurring during such brief periods is prevented by torque limiting clutch assembly 34. Torque spikes of amplitude less than the torque capacity or slip torque of torque limiting clutch assembly 34 are damped to some degree by damper clutch assembly 32. Dampers which operate on the principle of mechanical friction, such as damper clutch assembly 32, provide a constant amount of damping independent of relative velocity of the damper's friction surfaces. Hence, mechanical friction dampers over and/or under damp driveline systems which operate over wide speed and torque ranges. Such driveline systems are particularly under damped during resonance mode operation.

Looking now at the present invention flywheel assembly 100 shown in FIGS. 3-5, components therein which are substantially the same as components in FIG. 2 are given the same reference numeral suffixed with a prime. Assembly 100 includes primary and secondary flywheel assemblies 26', 28', a torsional vibration isolation mechanism including resilient means 30' and a torsional vibration damper assembly 102, and a drive means 104 for connection of the resilient means 30' directly to flywheel assembly 28'. The resilient means 30' and damper assembly 102, like means 30 and assembly 32, are connected in parallel between the flywheel assemblies.

Primary flywheel assembly 26' is functionally and structurally the same as flywheel assembly 26 with the exception of a plurality of openings 106 in intermediate wall portion 54a' of plate member 54' for securing a portion of damper assembly 102 to the primary flywheel assembly.

Secondary flywheel assembly 28' includes an annular radially extending mass 108 and an annular support member 110 securely fixed to mass 108 by a plurality of bolts 112. Mass 108 includes a master clutch friction surface 108a analogous to surface 40a, a plurality of bolt holes 108b for securing an unshown portion of a master clutch assembly 42' to the secondary flywheel assembly, and an annular axially extending hub portion 108c. Annular support member 110 includes a radially inwardly facing peripheral surface 110a for journaling the secondary flywheel assembly on a hub 50' via a bearing 62', and an annular axially extended portion 110b having external spline teeth 110c.

Resilient means 30' is as described previously with respect to FIG. 2. Coil springs 74' of the resilient means are connected to the secondary flywheel assembly by the drive means 104. The drive means includes a ring portion 104a disposed radially inward of the springs, a plurality of spline teeth 104b on the ring inner periphery and mating with spline teeth 108d of annular hub portion 108c of mass 108, and a plurality of finger portions 104c (phantom lines of FIG. 3) extending radially outward between the spaced apart ends of coil springs 74'. The finger portions have surfaces 104d facing circumferentially in opposite directions and initially spaced from end surfaces 76a' of spring retainers 76'. The initial spaces or gaps between surfaces 104d of the finger portions and surfaces 76a of the spring retainers provide a relatively spring free torque stage at engine idle.

Torsional vibration damper assembly 102 is disposed in an annular space generally defined by axially spaced surfaces of intermediate wall portion 54a' and a surface 108e of mass 108, and radially spaced portions of annular support member 110 and hub portion 108c of the secondary flywheel assembly. Damper assembly 102 includes an annular housing assembly 114 and an annular clutch assembly 116. The housing assembly includes first and second radially extending sidewalls 118, 120 respectively defining first and second radially extending clutch surfaces 118a, 120a in axially facing and spaced apart relation. The surfaces define an annular chamber 122 sealed at its radially outer extent by a static seal 124. The sidewalls are secured together at their radially outer extent by a rollover 126. First sidewall 118 includes a plurality of studs 118b received by openings 106 in intermediate wall portion 54a' to prevent rotational and axial movement of the housing assembly relative to the primary flywheel assembly. The free ends of the studs may be secured by swaging or deformation. Clutch assembly 116 includes a radially extending clutch member having first and second radially extending and oppositely facing clutch surfaces 116a, 116b respectively spaced from first and second clutch surfaces 118a, 120a for clutching coaction therebetween via a viscous shear liquid disposed in the chamber. The viscous liquid is of high viscosity and is preferably a silicone oil, for example, dimethyl polysiloxane. The inner periphery of the clutch member includes a plurality of internal spline teeth 116c mating with spline teeth 110c of annular support member 110. The radial flanks of teeth 110c, 116c may be provided with a predetermined circumferential spacing therebetween, as shown in FIG. 5, to form a lost motion means allowing minor to-and-fro relative rotation between the flywheel assemblies without corresponding relative rotation of the clutch surfaces of the damper assembly. Chamber 122 is closed at its radially inner extent by annular dynamic seals 128 disposed in annular grooves in sidewalls 118, 120 of the housing assembly. The seals also axially center or position the clutch member in chamber 122 to prevent rubbing of the closely spaced clutch surfaces. The amount of damping provided by damper assembly is directly proportional to the area of surfaces 116a 118a, and 116b, 120a, the spacing or gap between the surfaces, viscosity of the viscous liquid, and the relative velocity of the surfaces. Since damping increases with increasing relative velocity, damper assembly 102 is effective to increase damping in response to increasing need for damping at both high and low frequencies, that is, relative velocity of the clutch surfaces increases in proportion to the rate of torque change and the rate of torque change is particularly great during resonance mode operations. Hence, damper assembly 102 is effective to dampen torsionals during periods of resonance mode operation and is particularly effective to dampen resonance mode torque spikes during engine start-up/shut-down, and when the engine is lugged at speeds less than normal operating speeds. Further, damper assembly 102 provides improved damping over the entire operational range of the vehicle driveline.

Looking now at the alternative embodiment of FIG. 6 therein is shown a viscous shear damper assembly 200 embodying all of the features of damper assembly 102 and requiring less axial space for installation than damper assembly 102 by having the first sidewall of the annular housing defined by intermediate sidewall portion 54a" of primary flywheel plate member 54". Sidewall portion 54a" is deformed or machined to provide an annular groove for the dynamic seal 80'. The second sidewall 202 of the housing assembly is secured to plate member 54" by a weld 204 which also may be used to seal the damper assembly in lieu of static seal 124.

Two embodiments of the present invention have been disclosed for illustration purposes. The appended claims are intended to cover inventive features in the disclosed embodiments and modifications of the inventive features believed to be within the spirit of the invention.

What is claimed is:

1. A torsional vibration isolation mechanism including resilient means and a damper assembly drivingly disposed in parallel between first and second flywheel assemblies mounted for limited relative rotation about a common axis; the first flywheel assembly including a hub adapted for non-compliant connection to an engine output shaft and having an outer peripheral surface, an annular inertia ring fixed between radially extending plates, the first plate having a radially inner portion fixed to the hub; the second flywheel assembly including an annular radially extending inertia mass, an inner peripheral surface journaled on the outer peripheral surface of the hub, and a radially extending, axially facing clutch surface adapted for selective connection to a transmission input shaft via a clutch operative to frictionally engage the clutch surface; the resilient means including a plurality of circumferentially spaced apart coil springs disposed between the plates and radially inward of the inertial ring, the spring ends reacting between portions of the plates; drive means for connecting the spring ends with the second flywheel assembly and including a ring portion disposed radially inward of the springs, means connecting the ring portion to the second flywheel assembly, and a plurality of fingers extending radially outward into the spaces between the springs; the improvement comprising:

an annular space including an axially extending portion generally defined by axially spaced apart portions of the first plate and the second flywheel assembly and a radially extending portion generally defined by radially spaced apart portions of the second flywheel assembly; and the damper assembly comprising a viscous shear damper disposed in said annular space and including an annular housing assembly and a clutch assembly, means respectively connecting the housing and clutch assemblies for rotation with the first and second flywheel assemblies, said housing assembly including first and second sidewalls respectively defining first and second radially extending clutch surfaces in axially facing and spaced apart relation defining a chamber sealed at its radially outer extent, said clutch assembly including a radially extending clutch means disposed in the chamber and having first and second radially extending and oppositely facing clutch surfaces respectively spaced from the first and second axially facing surfaces of the sidewalls for clutching coaction therebetween via a viscous shear liquid disposed in the chamber and in response to relative rotation of the flywheel assemblies and dynamic seal means cooperating between said housing and clutch assemblies for sealing the radially inner portion of said chamber.

2. The isolation mechanism of claim 1, wherein said first sidewall and said first radially extending clutch surface defined thereby are defined by a portion of said first plate.

3. The isolation mechanism of claim 1, wherein said means connecting the second flywheel assembly to the clutch assembly includes lost motion means for allowing limited relative rotation of the flywheel assemblies without a corresponding relative rotation of said clutch surfaces of the damper assembly.

4. The isolation mechanism of claim 3, wherein said first sidewall and said first radially extending clutch surface defined thereby are defined by a portion of said first plate.

5. The isolation mechanism of claim 1, wherein the second flywheel assembly includes an annular support member fixed to a radially inner portion of the inertia mass and defining the inner peripheral surface journaled on the outer peripheral surface of the hub, said annular support member further including an axially extending portion disposed radially inward of the annular housing assembly, and said means connecting the second flywheel assembly to the clutch assembly being defined by the axially extending portion of the annular support member and an inner peripheral portion of said clutch assembly.

6. The isolation mechanism of claim 5, wherein said first sidewall and said first radially extending clutch surface defined thereby are defined by a portion of said first plate.

7. The isolation mechanism of claim 5, wherein said means connecting the annular support member to the inner periphery of the clutch assembly includes lost motion means for allowing limited relative rotation of the flywheel assemblies without a corresponding relative rotation of said clutch surfaces of the damper assembly.

8. A torsional vibration isolation mechanism including resilient means and a damper assembly drivingly disposed in parallel between first and second flywheel assemblies mounted for limited relative rotation about a common axis; the first flywheel assembly including a hub adapted for non-compliant connection to an engine output shaft and having an outer peripheral surface, an annular inertia ring fixed between radially extending plates, the first plate having a radially inner portion fixed to the hub; the second flywheel assembly including an annular radially extending inertia mass, an inner peripheral surface journaled on the outer peripheral surface of the hub, and a radially extending, axially facing clutch surface adapted for selective connection to a transmission input shaft via a clutch operative to frictionally engage the clutch surface; the resilient means including a plurality of circumferentially spaced apart coil springs disposed between the plates and radially inward of the inertia ring, the spring ends reacting between portions of the plates; drive means for connecting the spring ends with the second flywheel assembly and including a ring portion disposed radially inward of the springs and having an inner periphery with a plurality of spline teeth mating with spline teeth on an annular portion extending axially from the second flywheel assembly, and a plurality of fingers extending radially outward into the spaces between the springs;

an annular space including an axially extending portion generally defined by axially spaced apart portion of the first plate and the second flywheel assembly and a radially extending portion generally defined by radially spaced apart portions of the second flywheel assembly; and the damper assembly comprising a viscous shear damper disposed in said annular space and including an annular housing assembly and a clutch assembly, means respectively connecting the housing and clutch assemblies for rotation with the first and second flywheel assemblies, said housing assembly including first and second sidewalls respectively defining first and second radially extending clutch surfaces in axially facing and spaced apart relation defining a chamber sealed at its radially outer extent, said clutch assembly including a radially extending clutch means disposed in the chamber and having first and second radially extending and oppositely facing clutch surfaces closely spaced, respectively, from the first and second axially facing surfaces of the sidewalls for clutching coaction therebetween via a viscous shear liquid disposed in the chamber and in response to relative rotation of the flywheel assemblies and dynamic seal means cooperating between said housing and clutch assemblies for sealing the radially inner portion of said chamber.

9. A torsional vibration isolation mechanism including resilient means and a damper assembly drivingly disposed in parallel between first and second flywheel assemblies mounted for limited relative rotation about a common axis; the first flywheel assembly including a hub adapted for non-compliant connection to an engine output shaft and having an outer peripheral surface, an annular inertia ring fixed between radially extending plates, the first plate having a radially inner portion fixed to the hub; the second flywheel assembly including an annular radially extending inertia mass, an inner peripheral surface journaled on the outer peripheral surface of the hub, and a radially extending, axially facing clutch surface adapted for selective connection to a transmission input shaft via a clutch operative to frictionally engage the clutch surface; the resilient means including a plurality of circumferentially spaced apart coil springs disposed between the plates and radially inward of the inertia ring, the spring ends reacting between portions of the plates; drive means for connecting the spring ends with the second flywheel assembly and including a ring portion disposed radially inward of the springs, means connecting the ring portion to the second flywheel assembly, and a plurality of fingers extending radially outward into the spaces between the springs;

an annular space including an axially extending portion generally defined by axially spaced apart portions of the first plate and the second flywheel assembly and a radially extending portion generally defined by radially spaced apart portions of the second flywheel assembly;

the damper asembly comprising a viscous shear damper disposed in said annular space and including an annular housing assembly and a clutch assembly, means respectively connecting the housing and clutch assemblies for rotation with the first and second flywheel assemblies, said housing assembly including first and second sidewalls respectively defining first and second radially extending clutch surfaces in axially facing and spaced apart relation defining a chamber sealed at its radially outer extent, said clutch assembly including a radially extending clutch means disposed in the chamber and having first and second radially extending and oppositely facing clutch surfaces closely spaced, respectively, from the first and second axially facing surfaces of the sidewalls for clutching coaction therebetween via a viscous shear liquid disposed in the chamber and in response to dynamic seal means cooperating between said housing and clutch assemblies for sealing the radially inner portion of said chamber;

the second flywheel assembly including an annular support member fixed to a radially inner portion of the inertia mass and defining the inner peripheral surface journaled on the outer peripheral surface of the hub, said annular support member further including an axially extending portion disposed radially inward of the annular housing assembly, and said means connecting the second flywheel assembly to the clutch assembly including a plurality of mating spline teeth respectively defined by the axially extending portion of the annular support member and an inner peripheral portion of said clutch assembly; and the means connecting the annular support member to the inner periphery of the clutch assembly including lost motion means for allowing limited relative rotation of the flywheel assemblies without a corresponding relative rotation of said clutch surfaces of the damper assembly.

10. The isolation mechanism of claim 9, wherein said mating spline teeth are circumferentially spaced apart to allow limited relative rotation of the flywheel assemblies without a corresponding relative rotation of said clutch surfaces of the damper assembly.

* * * * *